March 3, 1942.   W. F. STRAUB   2,274,752
CONTAINER
Filed April 22, 1940   3 Sheets-Sheet 1
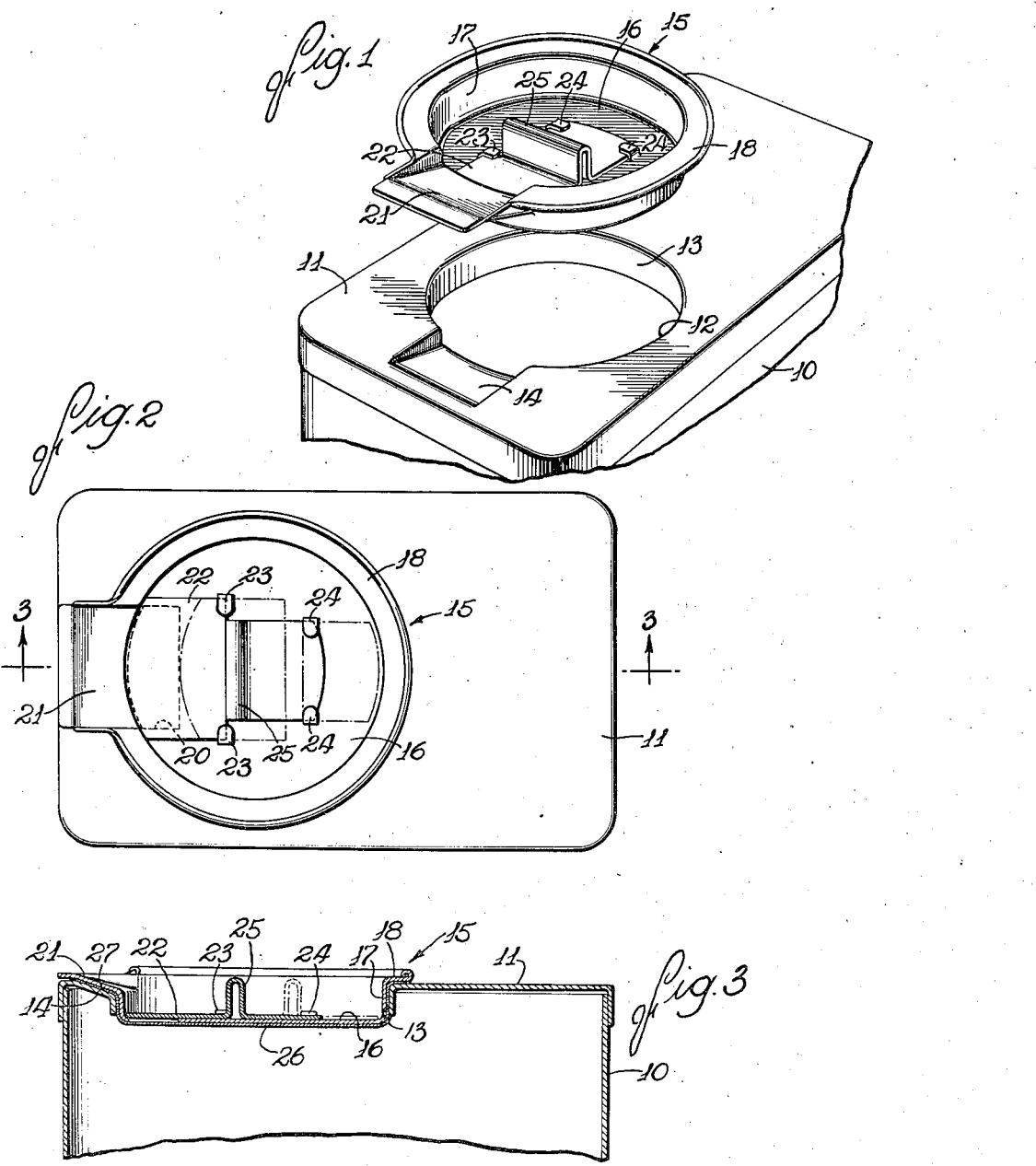
INVENTOR
Walter F. Straub
Parker, Carlson, Pitzner & Hubbard
ATTORNEYS March 3, 1942.  W. F. STRAUB  2,274,752
CONTAINER
Filed April 22, 1940  3 Sheets-Sheet 2
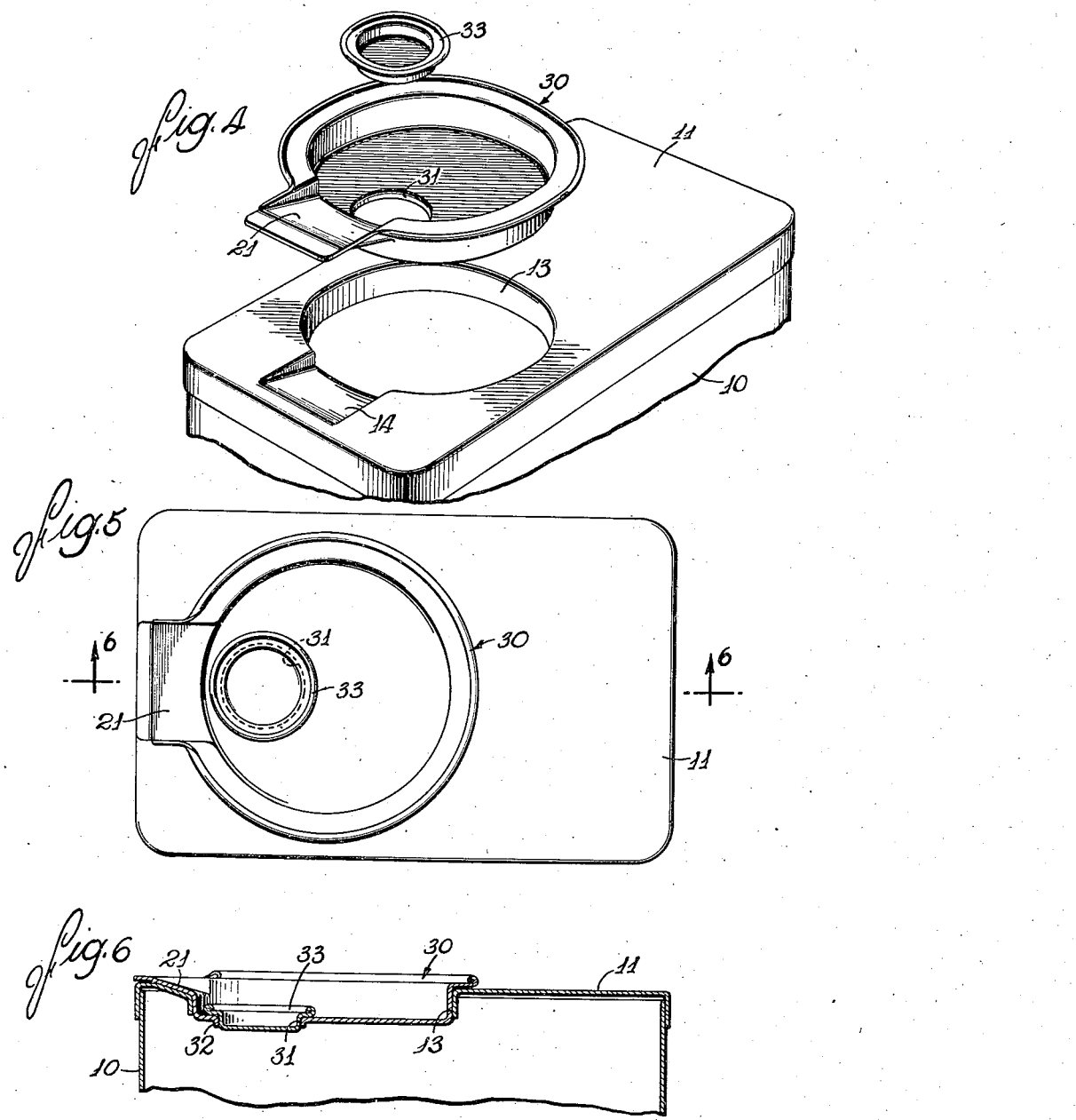
INVENTOR
Walter F. Straub
Parker, Carlson, Pitzner & Hubbard
ATTORNEYS March 3, 1942.                W. F. STRAUB                2,274,752
                                CONTAINER
                         Filed April 22, 1940        3 Sheets—Sheet 3
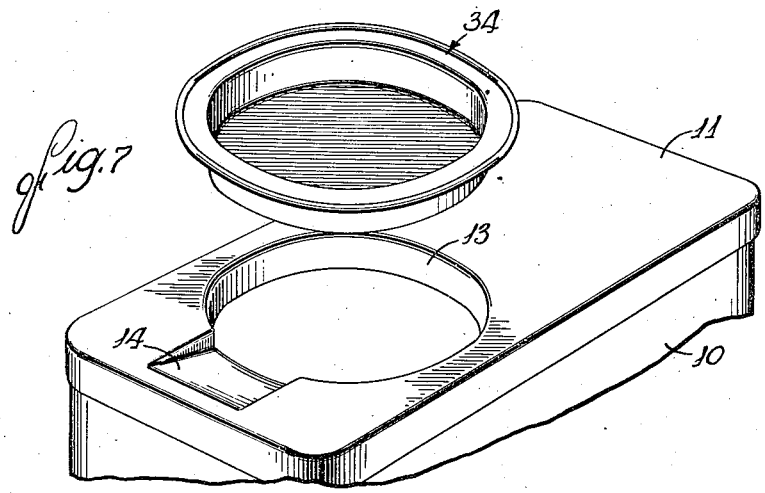
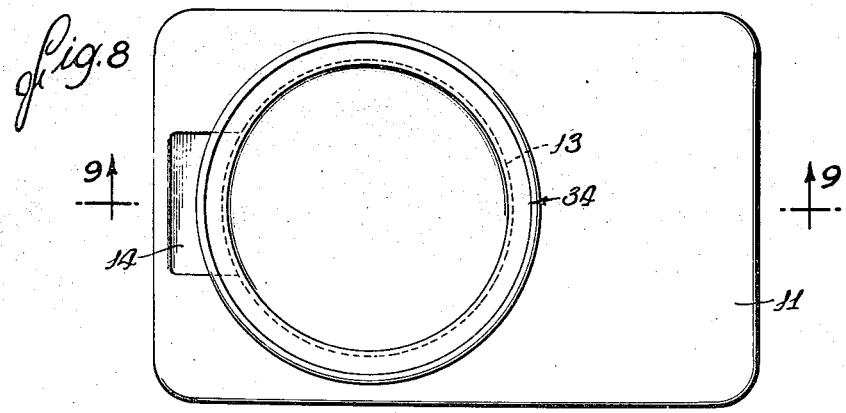
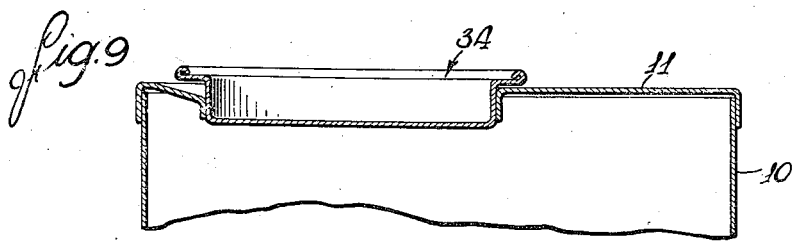
INVENTOR
Walter F. Straub
Parker, Carlson, Pitzner & Hubbard
ATTORNEYS Patented Mar. 3, 1942

2,274,752

UNITED STATES PATENT OFFICE 2,274,752

CONTAINER

Walter F. Straub, Chicago, Ill., assignor to W. F. Straub & Company, Chicago, Ill., a corporation of Illinois Application April 22, 1940, Serial No. 330,871

8 Claims. (Cl. 221—21)

The invention relates generally to containers for liquids and more particularly to a container provided with means for dispensing the contents thereof.

The general object of the invention is to provide a novel container provided at its top with dispensing means particularly adaptable for thick viscous liquids such as honey, which is of relatively inexpensive construction and which is easy to use.

It is also an object to provide a container having a substantially flat top which permits one container to be stacked on top of another, and which is provided with a dispensing means depressed within the top to avoid interference with such stacking.

Another object is to provide a container having a top provided with a dispensing means so constructed as to permit a relatively large controlled flow therethrough, or when desired, a smaller, easily controlled flow may be obtained.

A further object of the invention is to provide a container having a top constructed for dispensing the contents of the container in such a manner that a minimum amount of the contents remains on the exterior of the top when the flow is shut off, and such amount is confined so that it will not spread over other parts of the container.

Other objects and advantages will become apparent from the following description taken in connection with the accompanying drawings, in which:

Figure 1 is a fragmentary perspective view of a container embodying the features of the invention.

Fig. 2 is a plan view of the container shown in Fig. 1.

Fig. 3 is a vertical sectional view taken on the line 3—3 of Fig. 2.

Fig. 4 is a fragmentary perspective view of a modified form of container.

Fig. 5 is a plan view of the container shown in Fig. 4.

Fig. 6 is a vertical sectional view taken on the line 6—6 of Fig. 5.

Fig. 7 is a fragmentary perspective view of another modified form of the invention.

Fig. 8 is a plan view of the form shown in Fig. 7.

Fig. 9 is a vertical sectional view taken on the line 9—9 of Fig. 8.

As mentioned above, a container embodying the features of the invention is adapted particularly for use with relatively thick viscous liquids, such as honey. The features of the invention are such that they may be embodied in a container made of thin sheet metal. The container herein shown is of the type having a rectangular cross sectional area provided by vertically extending walls, and a flat top secured to the vertical walls in any desired manner. With liquids such as honey, it is desirable to control the flow of liquid from the container in such a manner that any drops of the liquid retained on the outer surface of the container after pouring will be confined to a definite part of the container rather than having an opportunity to spread over the sides thereof.

It is also desirable to equip the commercial container in which the liquid is sold with dispensing means which controls the flow of the contents. Because of the fact that each of the commercial containers is equipped with such a dispensing means, the cost thereof must be held to a minimum. Another desirable feature of commercial containers is to have them so shaped that they may be stacked one upon another. The dispensing means thus must lie substantially within the confines of the top wall of the container and not project above to any extent.

To incorporate these features, a container embodying the invention comprises generally vertical side walls and a relatively flat top wall. The top wall is provided with an aperture defined by a flange extending inwardly of the container, and an indented groove or channel is formed in the top wall extending from the aperture substantially to one side of the container to provide a pouring spout. To close the aperture, a dished cap is frictionally fitted within the aperture. The cap may also have a laterally extending spout which preferably fits within the indented groove or spout of the container top. The cap is provided with an opening adjacent its spout, and closure means are provided for said opening.

In the case where the friction cap is provided with an opening, such opening obviously is smaller than the aperture in the top of the container. Thus with such a structure, the entire cap may be removed and the aperture in the top utilized if desired to pour a relatively large amount of the fluid from the container. If the user wishes to pour a relatively small amount of the fluid from the container, the closure means over the opening in the cap may be removed or shifted to its open position. In either case, there is a spout available to control the flow from the container.

In the drawings, I have illustrated the preferred form of my invention in Figs. 1 to 3. Thus I have shown a container comprising side walls 10 supporting a relatively flat top 11. An aperture 12 is provided in the top 11 and said aperture is defined by a downwardly or inwardly extending flange 13. The top is also provided with an indented groove or channel 14 defining a pouring spout extending from the aperture 12 substantially to one side of the container. Thus when the contents of the container are poured through the aperture 12, the flow may take place through the pouring spout 14.

To close the aperture 12 a friction cap, indicated generally at 15, is provided. Such friction cap is generally of a well-known dished form comprising a bottom wall 16, a vertically extending peripheral flange 17, and a horizontally extending flange 18. The vertically extending flange 17 is adapted to have a frictional fit within the flange 13, and the cap is adapted to be pressed into the aperture far enough to have the flange 18 lie flat against the upper surface of the top 11. In order that the cap may have a sealing engagement with the flange 13, the pouring spout 14 has a depth at its inner end less than the depth of the flange 13 so that at least a portion of the height of the flange 13 is unbroken throughout the periphery thereof. The pouring spout 14 preferably decreases in depth toward the side of the container.

The cap 15 may also be provided with an opening 20 in its bottom wall 16, and with a laterally extending pouring spout 21 to control the flow through the opening 20. The pouring spout 21 is shaped to fit snugly within the pouring spout 14, as is apparent in Fig. 3.

The closure means in the preferred form of the invention is of a type manually shiftable from open to closed position in order to control the flow through the opening 20. To this end a T-shaped slide 22 is provided. The slide comprises a relatively flat strip in the present instance made of metal, adapted to overlie the opening 20 when in closed position, and having an arcuate forward edge conforming to the shape of the vertical flange 17 of the cap. To guide the movement of the slide 22, a pair of tongues 23 is struck up from or otherwise suitably formed in the bottom wall 16 of the cap adjacent the larger portion of the slide, and a second pair of tongues 24 is formed adjacent the rear end of the slide. The tongues 23 and 24 are bent over the upper face of the slide and thus serve to guide the movement thereof.

In order to readily manipulate the slide 22, an intermediate portion thereof is bent upwardly, as at 25, to form a handle. The slide is so dimensioned that when it is moved to the open position, such movement is limited by engagement of the handle 25 with the tongues 24, as indicated by the dash and dot lines in Figs. 2 and 3. The closed position of the slide is determined by abutment of the front arcuate edge of the slide with the flange 17 of the cap. It will be noted that the handle 25 does not project above the upper edge of the cap so that it will in no way interfere with stacking of the containers.

Since the slide 22 is held in position only by the friction of the tongues 23 and 24, sealing means is initially provided for closing the opening 20 in order that there shall be no leakage of the contents of the container through the opening. In the preferred form, such sealing means comprises a waxed paper or cardboard liner 26 which is preferably preformed in the shape of the cap 15 so that it is clamped between the flanges 13 and 17 and between the flange 18 and the upper surface of the top 11. The liner 26 also preferably includes a portion 27 extending between the pouring spouts 14 and 21 to form a secure seal therebetween. The liner 26 thus extends across the inside of the opening 20 and completely seals it. When the user obtains the container the slide is moved to its open position and the portion of the liner 26 underlying the opening 20 may be cut out by a sharp knife or the like In the modified form shown in Figs. 4 to 6 the top 11 of the container is of the same construction as shown in Figs. 1 and 3. The cap, indicated at 30, is of the same general construction as the cap 15 in the first form, but is provided with a round opening 31 having around its periphery a short downwardly extending flange 32. To close the opening 31 a second smaller cap 33 of the friction type is inserted in the aperture 31 in frictional engagement with the flange 32.

In the modified form shown in Figs. 7 to 9, the top 11 of the container is of the same form as shown in the two preceding constructions, but the cap, indicated at 34, in this instance is of simple round form, that is, it is not provided with a pouring spout. Thus in this modification the cap 34 must be removed in order to pour out the contents of the container.

In use, it will be noted that all embodiments of the invention illustrated herein provide for pouring the contents of the container in a relatively large stream by removing the cap and pouring through the aperture in the top wall. In so pouring, the spout 14 formed in the top 11 is utilized. However, should it be desired to pour the contents in a smaller stream, the forms of cap shown in Figs. 1 to 3 or Figs. 4 to 6 may be utilized in which the cap itself is provided with an opening and with a pouring spout. In the case of the form shown in Figs. 1 to 3, the opening 20 is adapted to be opened and closed merely by manipulation of the slide 22. In the case of the form shown in Figs. 4 to 6, the smaller cap 33 must be removed in order to pour through the opening 31.

From the foregoing it will be apparent that I have provided a novel container having dispensing means in its top for liquid such as honey, which is of relatively inexpensive construction. The dispensing means in all forms shown herein lies substantially at or below the level of the top of the container so that the containers may be stacked one upon the other. The dispensing means in all forms has a spout which limits the flow of the liquid and thus will prevent the outer surfaces of the container from being unduly smeared. In the forms shown in Figs. 1 to 3 and in Figs. 4 to 6, provision is made for pouring the contents in either a relatively large stream or in a relatively small stream.

I claim as my invention:

1. A container having, in combination, a relatively flat top provided with an opening and a downwardly extending flange at the periphery of the opening, said top having an indented groove extending from the opening substantially to one side of the container to provide a pouring spout, and a dished cap including a peripheral wall flange having a frictional fit within said downwardly extending flange for closing said opening, said groove having a depth at its inner end less than the depth of the downwardly extending flange so that at least part of the downwardly extending flange remains unbroken by said groove to form a tight seal with said peripheral wall flange of the cap, said groove decreasing in depth toward the side of the container.

2. A fluid container having, in combination, a top provided with an opening and a flange extending downwardly around the edge of the opening, said top having a depressed groove extending from the opening substantially to one side of the container, and a dished cap having a frictional fit within said flange and provided with a pouring spout fitting within said groove, said cap being provided with an aperture adjacent said spout.

3. A container having, in combination, a top provided with an opening defined by a flange extending into the container and with a depressed groove extending from said opening substantially to one side of said container, a dished cap having a frictional fit within said flange for closing said opening, said cap having an aperture in its bottom wall and a laterally extending pouring spout adjacent said aperture, said spout fitting within said groove when the cap is in place, and means for closing said aperture.

4. A container having, in combination, a relatively large opening in its top and a depressed groove extending from said opening to one side of the container to serve as a pouring spout from said opening, a dished cap fitting within said opening and provided with a small aperture and a pouring spout fitting within said groove, and closure means for said aperture, said closure means being removable from said aperture to permit pouring therethrough and said cap being removable to permit pouring through said opening.

5. A container having a relatively large aperture in its top defined by a downwardly extending flange, said top also having a depressed groove extending from said aperture substantially to one side of the container to serve as a pouring spout, a dished cap fitting within said aperture and having a pouring spout fitting within said groove, said cap also having an aperture smaller than said large aperture, and closure means for said smaller aperture, the pouring spout in the container top being of less depth than said flange and the pouring spout of said cap being of less depth than the depth of said cap whereby the cap and the flange have a complete peripheral engagement for at least a portion of their depth.

6. A fluid container having, in combination, a substantially flat top provided with an opening, a friction cap fitting within said opening and shaped so that it has no substantial height above said top, said cap having an aperture, a pair of interfitting pouring spouts respectively formed in said top and on said cap and being depressed below the level of said top, and closure means for said aperture and positioned below the level of the top of the cap.

7. A container having a top including an opening, a cap fitting within said opening and comprising a flat bottom wall and an upwardly extending peripheral flange, said bottom wall having a dispensing aperture therein, said peripheral flange having a grooved spout therein alined with said aperture, guide means formed on said bottom wall, and a slide mounted in said guide means and shiftable for opening and closing said dispensing aperture, said slide being limited in its closing movement by abutment with the base of said flange below said spout.

8. A container of the character described comprising, in combination, an upwardly facing top structure having an opening of substantial diameter for pouring material from the container, an inwardly extending flange on said structure surrounding said opening, a groove extending from adjacent the outer edge of said top structure in a slanting plane inwardly through the upper portion of said flange to provide a spout leading from said opening, and a dished friction cap for said opening having an upwardly extending peripheral wall flange and a lateral flange around the upper edge of said wall flange, said wall flange frictionally engaging said inwardly extending flange within the opening around its entire periphery and said lateral flange covering said top structure surrounding said opening and said spout groove.

WALTER F. STRAUB.